Feb. 23, 1965
D. J. RUDER
3,171,064
OPEN MULTIAPERTURE MAGNETIC CORE STRUCTURE
Filed April 18, 1963
2 Sheets-Sheet 1
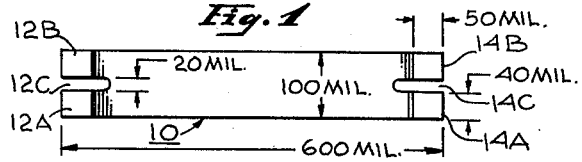
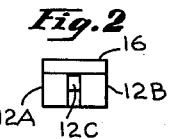
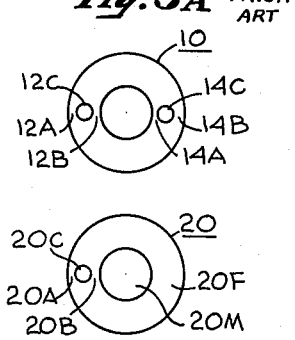
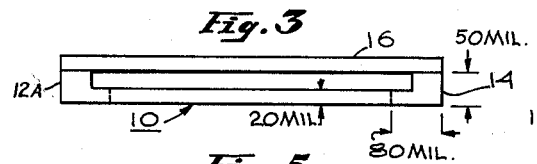
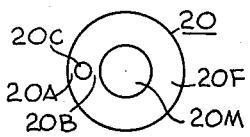
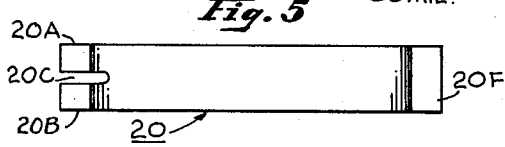
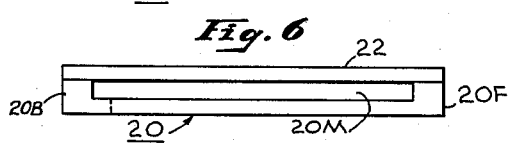
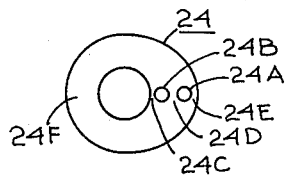
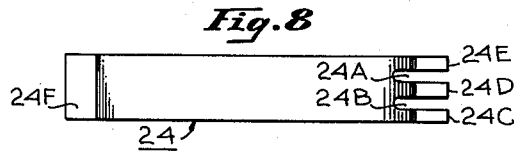
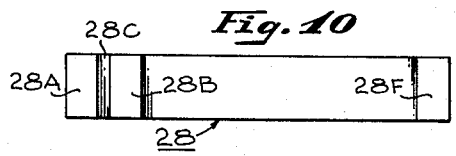
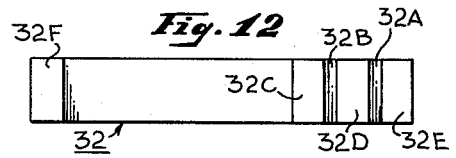
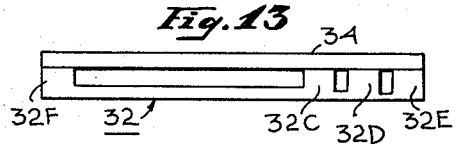
DONALD J. RUDER
INVENTOR.
BY Samuel Lindenberg
ATTORNEY Feb. 23, 1965  D. J. RUDER  3,171,064
OPEN MULTIAPERTURE MAGNETIC CORE STRUCTURE
Filed April 18, 1963  2 Sheets-Sheet 2
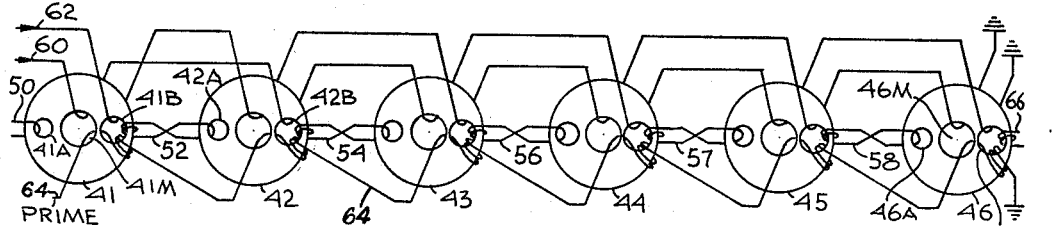
Fig. 14 PRIOR ART
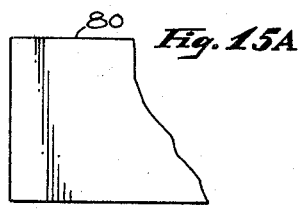
Fig. 15A
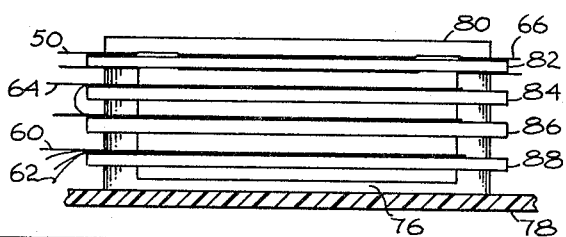
Fig. 16
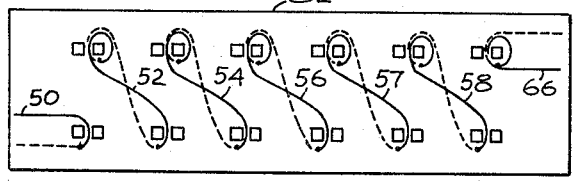
Fig. 15B
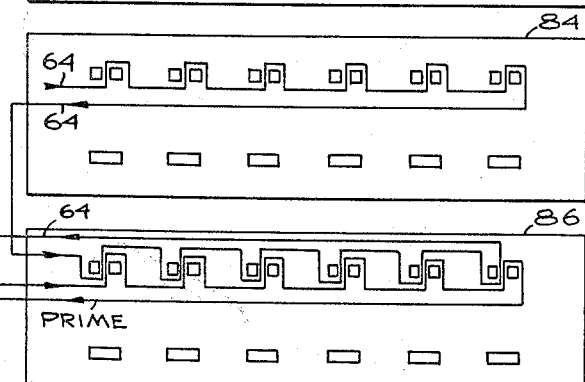
Fig. 15C
Fig. 15D
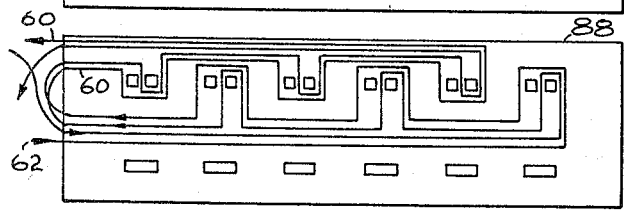
Fig. 15E
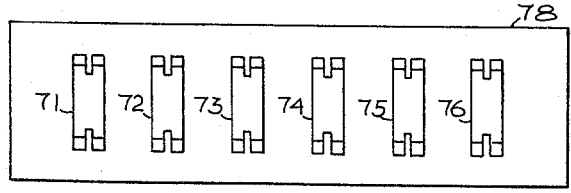
Fig. 15F
INVENTOR.
DONALD J. RUDER
BY Samuel Lindenberg
ATTORNEY United States Patent Office 3,171,064
Patented Feb. 23, 1965

3,171,064
OPEN MULTIAPERTURE MAGNETIC CORE
STRUCTURE
Donald J. Ruder, Menlo Park, Calif., assignor to Stanford
Research Institute, Palo Alto, Calif., a corporation of
California
Filed Apr. 18, 1963, Ser. No. 273,958
13 Claims. (Cl. 317—101)

This invention relates to magnetic multiaperture cores of the type used in logic switching or storage circuits and more particularly to improvements therein.

The use of multiaperture cores for shift registers, and/or logical circuits is well known in the data processing field. A multiaperture core normally comprises a ring-like structure of magnetic material having a central or main aperture, and one or more minor apertures disposed in the ring. Wiring for constructing a circuit is threaded through the central aperture and also through the minor aperture, following a predetermined pattern in accordance with the circuit structure desired to be effectuated. The manufacturing process of forming a multiaperture core from magnetic ferrite material is one which requires rather expensive dies which, because of the abrasive nature of the ferrite material, must be replaced rather frequently. The wiring which is applied to the multiaperture core devices requires some rather tedious hand threading techniques and, with the trend to making smaller cores gaining favor, this hand threading becomes extremely difficult.

An object of this invention is to provide a novel multiaperture core structure.

Yet another object of this invention is the provision of a multiaperture core structure which is simple to manufacture.

Still another object of the present invention is the provision of a multiaperture core structure whereby the wiring for magnetic devices is simplified.

Yet another object of the present invention is to provide a multiaperture core structure which enables the use of preformed wiring or of printed circuit wiring techniques.

Still another object of the present invention is the provision of a multiaperture core structure which is less expensive to fabricate than those made heretofore.

These and other objects of the present invention may be achieved in an arrangement wherein a magnetic structure is provided which is initially open to enable the insertion of preformed windings and thereafter may be closed. The structure has a U-shaped cross section with slots cut into at least one of the arms of the U and part way into the base. One arm of the U may be treated as the input side of the magnetic structure and the other arm of the U may be treated as the output side. The slot side of the structure will then have two poles analogous to the two legs on the input side of a multiaperture core which are adjacent to the minor aperture at the input side. If the output side is also slotted it too will have two poles also analogous to the two legs on either side of the minor aperture used on the output side of a multiaperture core. The center of the U-shaped magnetic structure may be considered as the portion analogous to the main or center aperture of a multiaperture core. Accordingly, with the foregoing analogy between the multiaperture core and the present invention in mind, windings may be placed on the structure of the present invention for accomplishing substantially the same logical operations as are accomplished with multiaperture cores. After the windings have been put in position, a keeper made of magnetic material is positioned so as to bridge the arms of the U and to close the required magnetic flux paths in the structure.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a plan view of an embodiment of this invention without a keeper.

FIGURE 2 is an end view of the embodiment of the invention.

FIGURE 3 is a side view of the embodiment of the invention.

FIGURE 3A is a drawing of a typical multiaperture ferrite core shown to assist in understanding the analogy to this invention.

FIGURE 4 illustrates a known type of multiaperture core having a single minor aperture.

FIGURES 5 and 6 are respective top and side views illustrating, in accordance with this invention, an open construction for the core shown in FIGURE 4.

FIGURE 7 illustrates a known type of multiaperture core having two minor apertures adjacent to one another.

FIGURES 8 and 9 are respective top and side views illustrating, in accordance with this invention, an open construction for the core shown in FIGURE 7.

FIGURES 10 and 11 are respective top and side views illustrating, in accordance with this invention, an alternate open construction for the core shown in FIGURE 4, and FIGURES 12 and 13 are respective top and side views illustrating an alternate open construction for the core shown in FIGURE 7.

FIGURE 14 is a schematic diagram of a multi-aperture core shift register of a type which is well known in the art.

FIGURES 15A through 15F shown the components which may be employed, in accordance with this invention, to produce a shift register, and FIGURE 16 shows as assembly of the parts shown in FIGURES 15A through 15G, to provide a shift register, in accordance with this invention.

Reference is now made to FIGURES 1, 2, and 3, which respectively show plan and side views of a magnetic structure made in accordance with this invention. This comprises a generally U-shaped body 10, of magnetic material having preferably a substantially rectangular hysteresis characteristic. As may be seen in the plan view of FIGURE 1, a slot 12C, 14C, is cut through each arm of the U and partially into the base in the plane of the U to establish separate poles respectively 12A, 12B, 14A, 14B. In FIGURES 2 and 3 a keeper 16, is shown in position which bridges over all of said poles for the purpose of completing the magnetic flux paths.

Each one of the poles 12A, 12B, 14A, 14B, may be considered analogous to the similarly identified legs of material in the multiaperture core shown in FIGURE 3A. Alternatively expressed, the bridged over slots 12C, between poles 12A, 12B, corresponds to the core minor aperture between legs 12A and 12B in FIGURE 3A. The bridged over slot 14C, between poles 14A and 14B, corresponds to the core minor aperture between the legs 14A, 14B, in FIGURE 3A. The center aperture, of the core in FIGURE 3A, corresponds to the center aperture of the completed or bridged over structure shown in FIGURE 3.

Having established the analogy between the magnetic structure, in accordance with this invention, and a multiaperture core, it should be appreciated that the utility of this invention in connection with circuits for performing storage, switching, or logic, is substantially identical with that of a multiaperture core. However, because this invention enables the wiring to be placed over the poles before the keeper is put in place, it will be obvious that it is quicker and simpler to wire magnetic core circuits using this invention, rather than using prior art multiaperture cores. The magnetic material of which the U-shaped structure herein is composed may be any suitable type, such as a metal or the ferrite square loop magnetic material which is used for multiaperture cores. The keeper can be composed of either the same square loop material as the rest of the core or may be a more linear high permeability material. The magnetic structure may be molded if desired, but more simply can be machined from larger pieces of material. The machining can be done simply by a series of straight cuts with abrasive disks. Thus, the wiring of the device as well as its manufacture, are both simpler than that required to make multiaperture cores and/or multiaperture core structures.

The dimensions provided in FIGURES 1 and 3 are by way of illustration of the dimensions of an operative embodiment of the invention which was constructed. These dimensions should not be construed as a limitation upon the invention since they may be made smaller or larger as required.

FIGURE 4 is a drawing of a presently known single minor aperture multiaperture core. The core 20 has a minor aperture 20C with a leg of material respectively 20A, and 20B, on either side, on which windings may be threaded. The core has a central aperture 20M, the side opposite the side containing the minor aperture is designated by the reference numeral 20F.

FIGURES 5 and 6 are respective plan and side views of an open core structure, in accordance with this invention, which can replace the core shown in FIGURE 4. FIGURE 6 shows a keeper 22, in place, and in FIGURE 5 the keeper is removed. Those portions of the core structure in FIGURES 5 and 6, which function identically as portions of the core structure in FIGURE 4 bear the identical reference numerals. It will be noted the core structure of FIGURES 5 and 6 is identical with the U-shaped structure shown in FIGURES 1, 2 and 3, except that only one arm of the U is slotted. The slot 20C, has poles 20A and 20B, on either side which can function in an analogous manner to the material legs 20A and 20B in FIGURE 4, spaced by the minor aperture 20C. The other arm 20F, of the open core shown in FIGURES 5 and 6, corresponds to the side 20F in FIGURE 4.

FIGURE 7 is a drawing of a presently known multiaperture core 24, having the two minor apertures respectively 24A and 24B adjacent one another. Three legs of material respectively 24C, 24D, 24E, are established on either side of and between the two minor apertures 24A and 24B. The side of the core opposite the minor apertures is designated by reference numeral 24F.

FIGURES 8 and 9 are respective top and side views of an open core construction, in accordance with this invention, which may be used in place of the core shown in FIGURE 7. FIGURE 9 shows the keeper 26 in place. This core has the same U-shaped structure as is shown for the open core structure in FIGURES 1, 2 and 3. There are two slots 24A, 24B, in one of the U-shaped arms, forming three poles respectively 24C, 24D, 24E. These correspond in function to the similarly referenced structures shown in FIGURE 7.

While the open core structures shown and described thus far, having slots in the arms extending in the direction of the plane of the U-shaped cross section are preferred, an open core structure may also be constructed with the slots in the arms extending transversely to the U-shaped cross section. FIGURES 10 and 11 are respectively top and side views of a U-shaped core 28, which has a transverse slot 28C, in one of the arms and on either side is a pole respectively 28A, 28B. This core structure may be used in place of the core structure shown in FIGURES 5 and 6. The poles 28A, 28B, and the side 28F, are analogous in function to the poles 20A, 20B, and the side 20F. If both arms of the open core 28 had a transverse slot, then the structure would be analogous to the core shown in FIGURES 1, 2 and 3. A keeper 30 is used to bridge the arms of the U, after wiring is put in place. The slot 28C extends deeper into the base than the central opening of the core in order to assist in providing separation of the flux paths extending through the respective poles 28A, 28B into the base.

FIGURES 12 and 13 are top and side views of an alternative core structure to that shown in FIGURES 8 and 9. Here also, the slots 32A and 32B extend through the arm of the core transversely to the U-shaped cross section. The poles 32C, 32D, 32E, formed by the slots are analogous to the poles 24C, 24D, 24E, of the core 24. The core 32 can be used in place of core 24. As shown in FIGURE 13, the transverse slot 32A is deeper than slot 32B. This is done to better distribute the flux which circulates into the three poles from the base of the U. A keeper 34 is used to bridge the poles after the wiring is put in place.

By way of an illustration of how the embodiment of the invention simplifies the wiring over prior art structures, in FIGURE 14 there is shown an arrangement for a multiaperture core shift register which is well known. This will include, by way of example, six multiaperture cores respectively 41 through 46. Each one of these cores will have an input minor aperture respectively 41A through 46A, and an output minor aperture respectively 41B through 46B. Each one of the cores has a central aperture respectively 41M through 46M. An input winding 50, is inductively coupled to the input aperture 41A in order to introduce data into the first core 41. Transfer windings respectively 52, 54, 56, 57, 58, are employed for transferring the state of magnetic remanence of a preceding core to a succeeding core. Transfer winding 52 inductively couples core 41 to core 42, taking twice as many turns around the leg of material adjacent output aperture 41B as it does around the leg of material adjacent input aperture 42A. The other transfer windings are similarly disposed with respect to the cores which they serve to couple.

A clear odd winding 60, is coupled to all of the cores in the register passing first through the main aperture of an odd core 41, then through the output aperture 42B of an even core 42, then through the main aperture of the succeeding odd core 43 etc. The functino served by the clear odd winding 40, when it is excited with current, is to drive all of the odd numbered cores to their clear states and to hold the output legs of the even numbered cores in their clear states so that the setting of the even cores results from the transfer winding currents which link the input apertures of the even cores and not from the transfer winding currents which link the output apertures of the even cores. In other words, the clear odd winding 40 serves as a clearing winding for all of the odd cores and as a holding winding for all of the even cores.

A clear even winding 62, functions in an analogous manner to the clear odd winding 60, except that it serves to clear all of the even cores when it is excited with current, and to hold all of the odd cores unaffected as a result. The clear even winding 62 passes through the output aperture 41B of the core 41 and then through the central aperture of core 42 and then through the output aperture of core 43, etc.

A priming winding 64, is inductively coupled to all of the cores in the shift register. It first passes through the main aperture of a core, such as 41M, then through the output aperture 41B, taking two turns around the leg of material between the output aperture 41B and the outer periphery of core 41 before extending into the main aperture of the succeeding core 42. An output winding 66, is inductively coupled to the output aperture 46B of the last core of the shift register.

The operation of the shift register shown in FIGURE 14 is quite well known. Briefly, a pulse of current applied to the input winding 50 causes core 41 to be driven to its set state of magnetic remanence. Current which is applied to the prime winding 64, primes the ferrite material around the output aperture 41B of core 50. The next clear odd pulse of current which is applied to winding 60, drives core 41 to its clear state. As a result, a current is induced in transfer winding 52, which is applied to core 42, driving it to its set state of magnetic remanence. A priming operation occurs to the ferrite material of core 42, surrounding the aperture 42B. Current applied to the clear even winding 62, drives core 42, from its prime to its clear state of magnetic remanence resulting in the transfer of core 43 from its clear to its set state of magnetic remanence.

FIGURES 15A through 15F represent the several components which may be assembled as shown in FIGURE 16 to provide a shift register utilizing the teachings of this invention. FIGURES 15A through 15F are views in elevation of the various components while FIGURE 16 is a side view of the assembly. It should be appreciated that the threading of the various windings for the multiaperture core shift register shown in FIGURE 14, provides a tedious chore. The cores are usually small, being on the order of 400 mils diameter or less and the apertures are quite small being on the order of 20 mils diameter. The wires used for the various windings are also very thin. In accordance with this invention, prefabricated or printed circuit wiring may be employed. The printed circuit wiring is shown in the views of FIGURES 15B through 15E. Such printed circuit wiring is deposited on cards which are then positioned over the poles of the six magnetic bodies respectively 71 through 76, which are used to replace the six cores 41 through 46. Each of these six magnetic bodies are identical with the one shown in FIGURES 1 through 3. They are spaced from one another and are mounted on an elastic substrate 78, by any suitable means, such as cement. After the wiring cards are put in place, a keeper 80, is put in place and the circuit is completed.

FIGURE 15A shows a keeper 80, which may be placed over all of the poles after the printed circuit wiring represented by FIGURES 15B through 15E, has been put in place. The order of the placement of the printed circuit wiring over the posts of the six magnetic bodies 71 through 76, is immaterial.

FIGURE 15B shows the printed circuit wiring for the input winding 50, the output winding 66, and the transfer winding respectively 52 through 58. It will be appreciated that both sides of the printed circuit board 82, may be employed in order to provide the necessary two turns of a transfer winding on a core. Accordingly, one turn is taken on one side of the printed circuit board 82, and then passes through a hole in the printed circuit board to another turn taken on the other side. The winding turn on the opposite side of the printed circuit board is represented by the dotted lines. The printed circuit board has holes cut out to enable its fitting over the poles of the six magnetic bodies 71 through 76.

The printed circuit wiring for the prime winding 64 is shown on two printed circuit boards which are represented by FIGURES 15C and 15D. This is made necessary because of the fact that the prime winding first passes through a main aperture and then through an output aperture of a core, thereby coupling around the leg of material between the output aperture and the central aperture of the core. Thereafter, it takes two turns around the remaining leg of the output aperture and then precedes to the succeeding core to be coupled thereto in the same manner. Since it is immaterial whether the priming winding couples to the inner leg of material of each core first, and then to the outer leg of material of each core, advantage is taken of this to simplify the requisite printed circuit wiring. Thus, in FIGURE 15B, the printed circuit board 84, has cutouts so that it can be fitted over the poles of the magnetic bodies 71 through 76. The priming winding 64 is printed on one side of the board 86. The priming winding 64, first passes on the main aperture side of the printed circuit board, and then takes one turn around the aperture through which one of the poles of the magnetic body 71 is to be inserted. It thereafter follows the same pattern for the apertures provided for the poles of the succeeding bodies 72 through 76. It then returns to the input side of the printed circuit board 84, in order that it may be connected to the winding on the printed circuit board 86, which is shown in FIGURE 15D. There the winding sequence is first a turn around the openings corresponding to the omitted opening on the board 84, then in similar fashion to all the remaining similarly positioned openings, thereafter returning to the input side of the printed circuit board on the outer edge thereof. The winding then winds around the apertures, for the other poles i.e. the same as the one around which it was wound in FIGURE 15C, thereby making two turns around that aperture. The winding then returns to the input side of the printed circuit board 86.

The winding 60, which is the clear odd winding, follows a winding pattern in which it first passes down through central aperture portion of the printed circuit board 88, and thereafter returns to the input side of the printed circuit board by taking a turn around one of the pole openings for every even numbered magentic body. It thereafter returns, taking a turn around both pole apertures for every odd numbered magnetic body, and then returns back to the input side of the printed circuit board 88, along the outside edge.

The pattern which the clear even winding follows, is identical with the one followed by the clear odd winding except that its sequence of couplings is with respect to the even cores, instead of with respect to the odd cores.

As is shown in FIGURE 16, each one of the respective printed circuit boards with the windings thereon, is stacked in position over the poles of the six magnetic bodies 71 through 76. Preferably, a single keeper 80, may be employed for all six magnetic bodies. However, if desired, a separate keeper may be used for each one of the magnetic bodies. In any event, the keeper is firmly pressed down on top of the poles in order to complete the required magnetic paths for the structure. The keeper may be pushed down on top of the poles and maintained in position by any suitable pressure mechanism, such as a clamp (not shown). In order to minimize the air gap between the keeper and the poles, their opposing surfaces are polished, preferably until they become light reflecting. The electrical operation of the assembly shown in FIGURE 16 is identical with that described for the shift register, shown in FIGURE 14.

The effect of the air gap and the keeper on the hysteresis characteristic of the magnetic structure is to reduce its squareness somewhat, both in the saturation and switching regions. Steps may be taken to minimize this effect as by reducing the length of the air gap by highly polishing the opposing flat surfaces of the posts and the keeper. The poles may be plated with high magnetic permeability metal and then polished to improve flatness. The flux density across the air gap may be reduced by enlarging the areas of the post faces opposite the keeper. A high magnetic permeability cement may be used between the keeper and each of the magnetic bodies but this is not preferred. If a good reflecting or mirror finish is obtained on the pole tips and on the opposite keeper surfaces, then the pressure that is required on the keeper is principally to compensate for any unevenness in the lengths of the poles since the air gap is minimal between opposing flat surfaces and is not affected much by increasing pressure.

It will be appreciated that with the present invention prefabrication techniques may be employed and what has been heretofore a tedious wiring and assembly job is simplified and expedited. Wiring using this invention is accomplished by encircling the various magnetic paths by conductors before the keeper is brought against the structures. This is in contrast with wiring of conventional core structures, which is accomplished by threading wires through various apertures. This invention also eliminates all the failures and potential failures which occur as a result of the wire threading operation, such as chipped or cracked cores, incorrect wiring patterns, shorts from scraped insulation, broken or stressed wires and faulty connections in the coupling loops.

From the foregoing description, it should be appreciated that there is a large class of multiaperture cores which have open structure realizations. A core has an open structure realization if a plane can be passed through all of the minor apertures and the main aperture of the core. This rule applies since if the plane actually cuts the core two sections, each section has opened apertures. These can then be bridged by a keeper. Thus, the core forms shown and described herein are exemplary and are not to be considered as restrictive.

There has accordingly been described and shown herein, a novel, useful and improved construction for a magnetic element which affords the operation capabilities of a multiaperture core without the difficulties attendant the fabrication thereof, as well as the wiring thereof.

I claim:

1. A magnetic element comprising a body of magnetic material having a substantially rectangular hysteresis characteristic and having a substantially U-shaped cross section with two arms extending away from the base of said U, a slot extending through at least one of said arms and forming at least two poles at said one of said arms, the distance between said two arms extending away from said base being considerably larger than the distance between the two poles formed by said slot, and a keeper made of magnetic material bridging the ends of said two arms.

2. A magnetic element as recited in claim 1 wherein said slot extending through at least one of said arms extends therethrough in the direction of the plane of the U-shaped cross section and also extends part way into the base of said U.

3. A magnetic element as recited in claim 1 wherein said slot extending through at least one of said arms extends therethrough transversely to the plane of the U-shaped cross section.

4. The construction recited in claim 1 wherein said keeper is made of magnetic material having a linear magnetic characteristic and said U-shaped magnetic element is made of magnetic material having a substantially rectangular magnetic characteristic.

5. The structure as recited in claim 1 wherein the opposing ends of said arms and said keeper are polished to a light reflecting finish surface.

6. A magnetic element comprising a body of magnetic material having substantially rectangular magnetic hysteresis characteristics and having a substantially U-shaped cross section with two arms extending away from the base of said U, two slots extending through one of said arms, said slots being parallel and spaced from one another forming three poles in said one of said arms extending from the base of said U, the space between the two arms of said U being many times greater than the space between poles formed by any one of said slots, and a keeper made of magnetic material bridging the ends of said two arms.

7. A magnetic element as recited in claim 6 wherein said two slots extending through one of said arms extend therethrough in the direction of the plane of the U-shaped cross section and also extend part way into the base of said U.

8. A magnetic element as recited in claim 6 wherein said two slots extending through one of said arms extend therethrough transversely to the plane of the U-shaped cross section, one of the slots being deeper than the other.

9. The structure as recited in claim 6 wherein said keeper is made of magnetic material having a linear magnetic characteristic and said U-shaped magnetic element is made of magnetic material having a substantially rectangular magnetic characteristic.

10. The structure as recited in claim 6 wherein the opposing ends of said arms and said keeper are polished to a light reflecting finish.

11. A magnetic element comprising a body of magnetic material having substantially rectangular magnetic hysteresis characteristics and having a U-shaped cross section and a slot extending in the plane of the U-shaped cross section through each one of the arms of the U and part way into the base, the distance between said arms being considerably greater than the length of said slot along the line transverse to the plane of said U-shaped cross section, and a keeper made of magnetic material bridging all of the ends of the arms of the U-shaped magnetic material body.

12. A magnetic device comprising a generally U-shaped magnetic element made of a material having substantially rectangular characteristics and having a base and on each end of said base two parallel posts extending outwardly an equal distance therefrom, the distance between said arms being greater than the length of said arms, a sheet of insulating material having apertures therethrough through which said posts extend, said sheet of insulating material being positioned adjacent said base, printed circuit wiring disposed over the surface of said sheet of insulating material to couple inductively with said posts and a keeper made of magnetic material covering the ends of said posts.

13. A magnetic device comprising a plurality of generally U-shaped magnetic elements, each being made of a material having substantially rectangular characteristics, each having a base and an upstanding arm at each end of said base extending outwardly, parallel to one another and having an equal length, one of the arms of each of said magnetic elements being slotted to provide a pair of parallel poles, the distance between the two arms of a magnetic element being considerably larger than the distance between the pair of poles in said magnetic element formed by a slot, a sheet of insulating material having apertures therethrough to enable said upstanding arms of said plurality of elements to extend therethrough, printed circuit wiring disposed over the surface of said sheet to couple inductively with the arms of each of said elements, and a keeper of magnetic material bridging the ends of the arms of said plurality of magnetic elements.

References Cited by the Examiner

UNITED STATES PATENTS 2,825,892  3/58  Duinker _____ 336—212 X

FOREIGN PATENTS 854,714  11/60  Great Britain.

OTHER REFERENCES

Niemann: 1,024,166, Feb. 13, 1958 (German printed application).

LARAMIE E. ASKIN, *Primary Examiner.*